United States Patent [19]

Schwarze

[11] Patent Number: 5,082,106
[45] Date of Patent: * Jan. 21, 1992

[54] STRIPPING DEVICE FOR THE RETURN RUN OF CONVEYOR BELTS

[76] Inventor: Hans O. Schwarze, Esseler Str. 170, D 4350 Recklinghausen, Fed. Rep. of Germany

[*] Notice: The portion of the term of this patent subsequent to Jul. 25, 2006 has been disclaimed.

[21] Appl. No.: 383,449

[22] Filed: Jul. 24, 1989

Related U.S. Application Data

[63] Continuation of Ser. No. 76,728, Jul. 23, 1987, Pat. No. 4,850,474.

[30] Foreign Application Priority Data

Jan. 8, 1986 [DE] Fed. Rep. of Germany ....... 3626131

[51] Int. Cl.$^5$ ............................................. B65G 45/00
[52] U.S. Cl. ..................................................... 198/499
[58] Field of Search ................ 198/497, 499; 15/256.5

[56] References Cited

U.S. PATENT DOCUMENTS

| | | | |
|---|---|---|---|
| 3,952,863 | 4/1976 | Schattauer | 198/499 |
| 4,036,351 | 7/1977 | Reiter | 198/499 |
| 4,359,150 | 11/1982 | Bowman et al. | 198/499 X |
| 4,529,084 | 7/1985 | Zhang | 198/499 |
| 4,633,999 | 1/1987 | Perneczky | 198/499 |

FOREIGN PATENT DOCUMENTS

| | | | |
|---|---|---|---|
| 0572499 | 11/1958 | Belgium | 198/499 |
| 0004809 | 10/1979 | European Pat. Off. | 198/497 |
| 2709714 | 9/1978 | Fed. Rep. of Germany | 198/499 |
| 1549976 | 3/1978 | United Kingdom . | |
| 2040249 | 8/1980 | United Kingdom | 198/499 |

*Primary Examiner*—D. Glenn Dayoan
*Attorney, Agent, or Firm*—Banner, Birch, McKie & Beckett

[57] ABSTRACT

The invention relates to a stripping device for the return area of conveyor belts. To set up parallelity between the individual stripping lamellae (4) and the belt surface, an adjustment about an axis (20) as swivelling movement is proposed which forms an angle α with the belt surface which differs from 90°. In a further development, it is provided that it is also possible to adjust the height setting and the contact pressure force of each stripping element (1) against the belt surface. For this purpose, a displacement of the stripping element (1) about an axis (40) is taught which extends essentially vertically with respect to the surface of the belt (8).

13 Claims, 9 Drawing Sheets

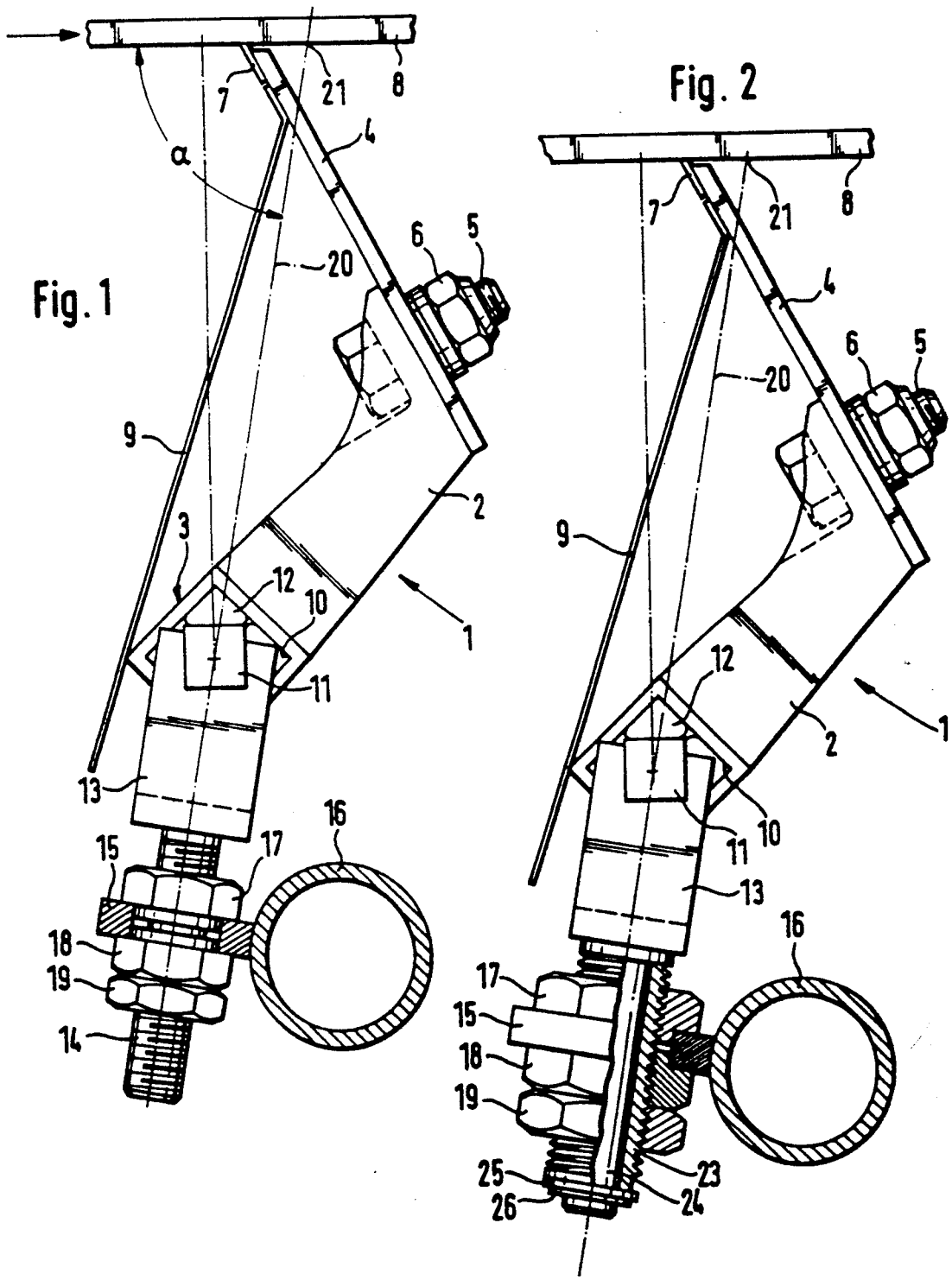

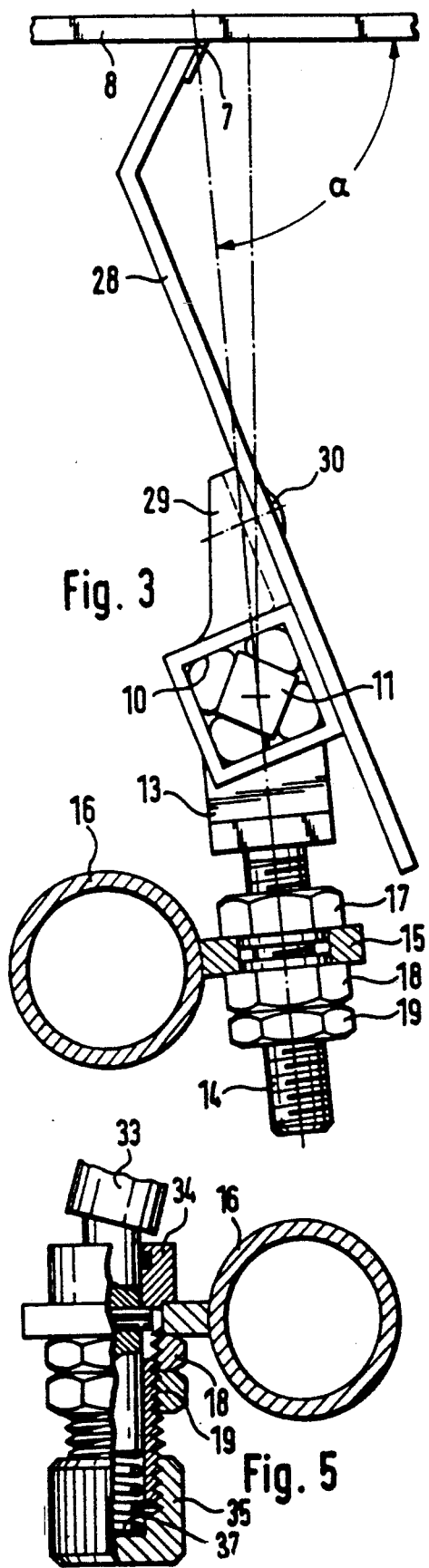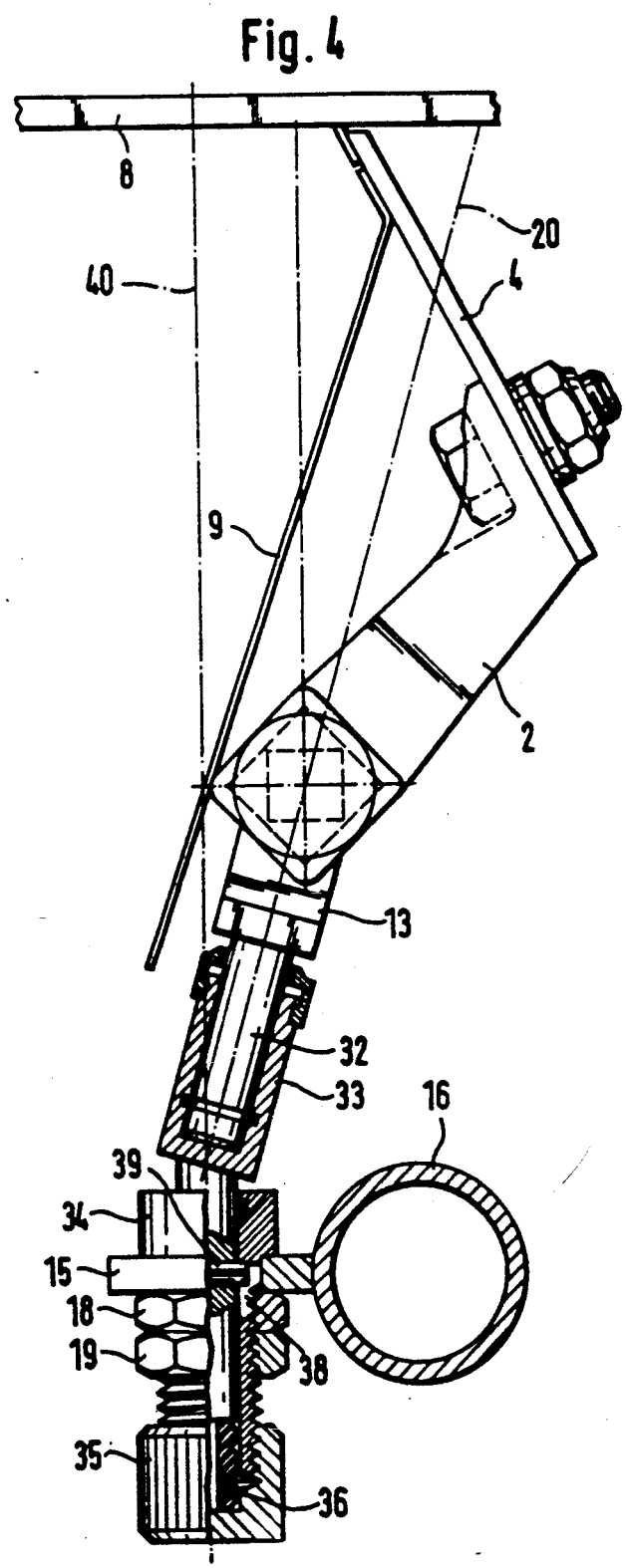

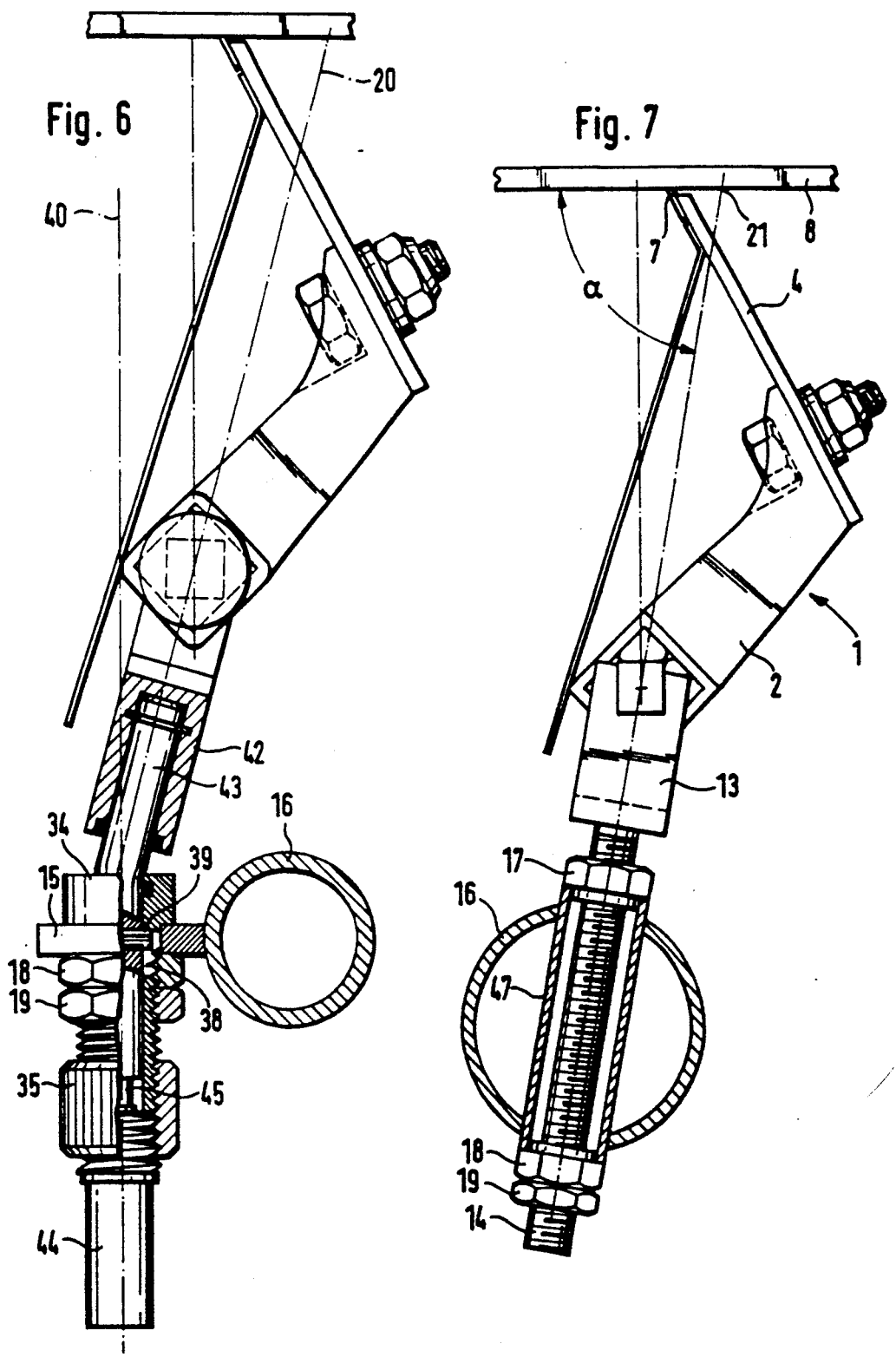

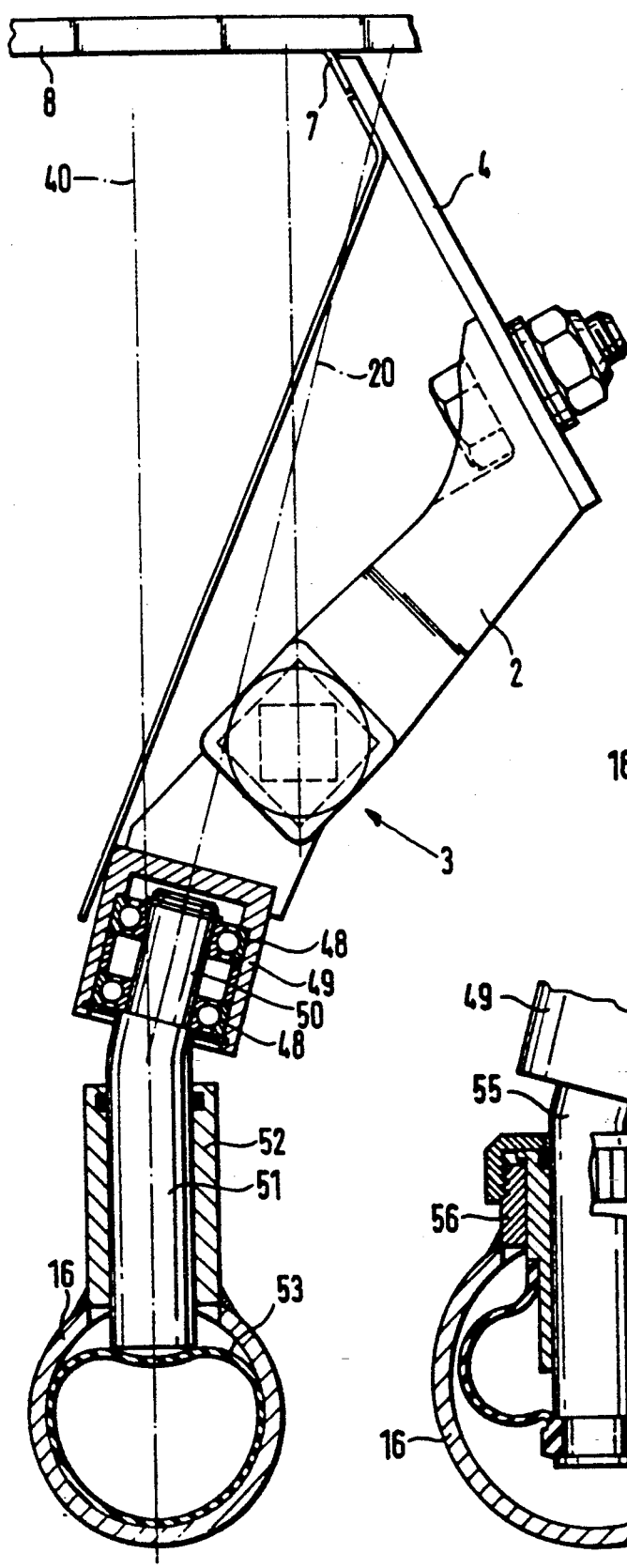
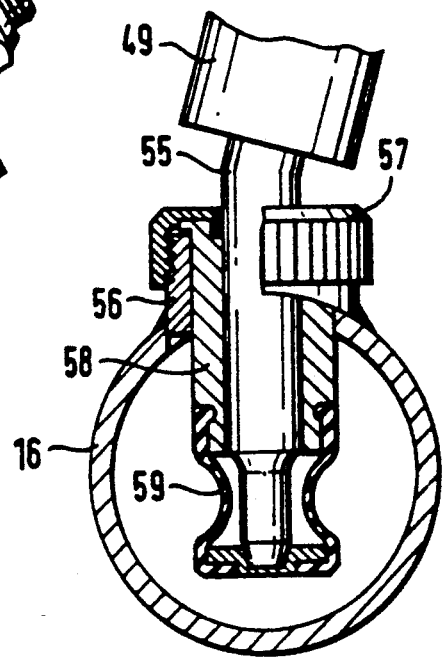

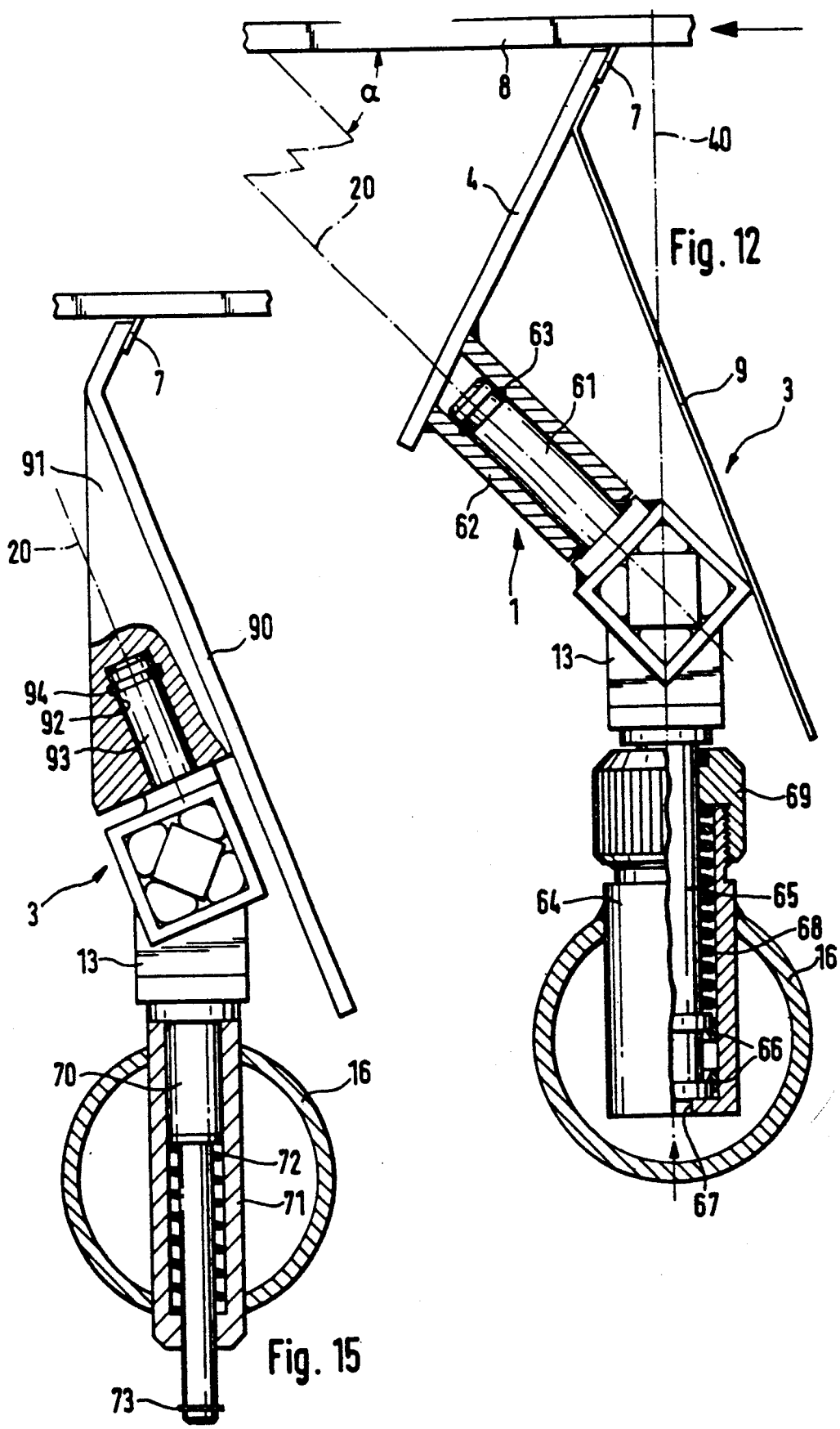

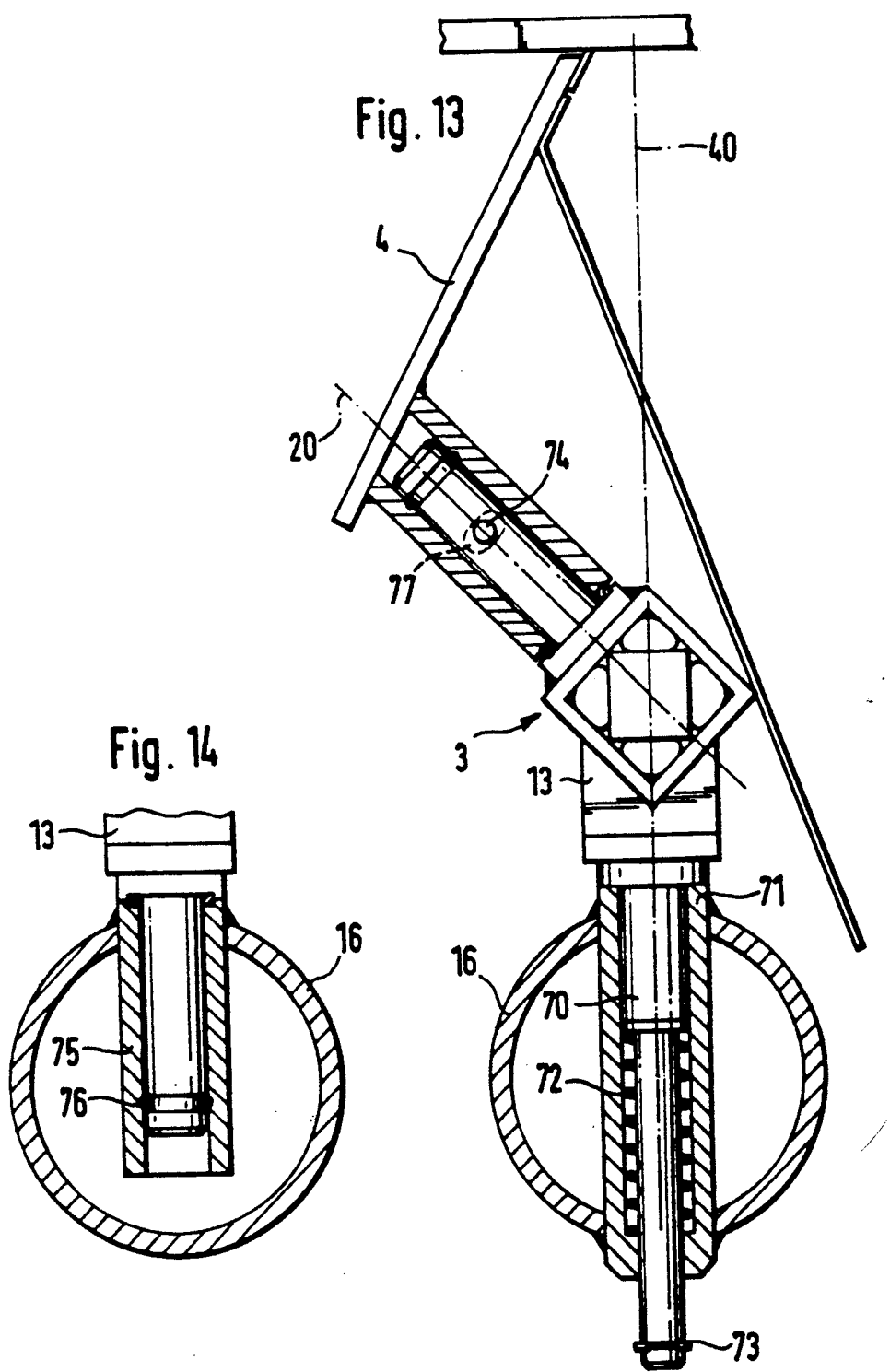

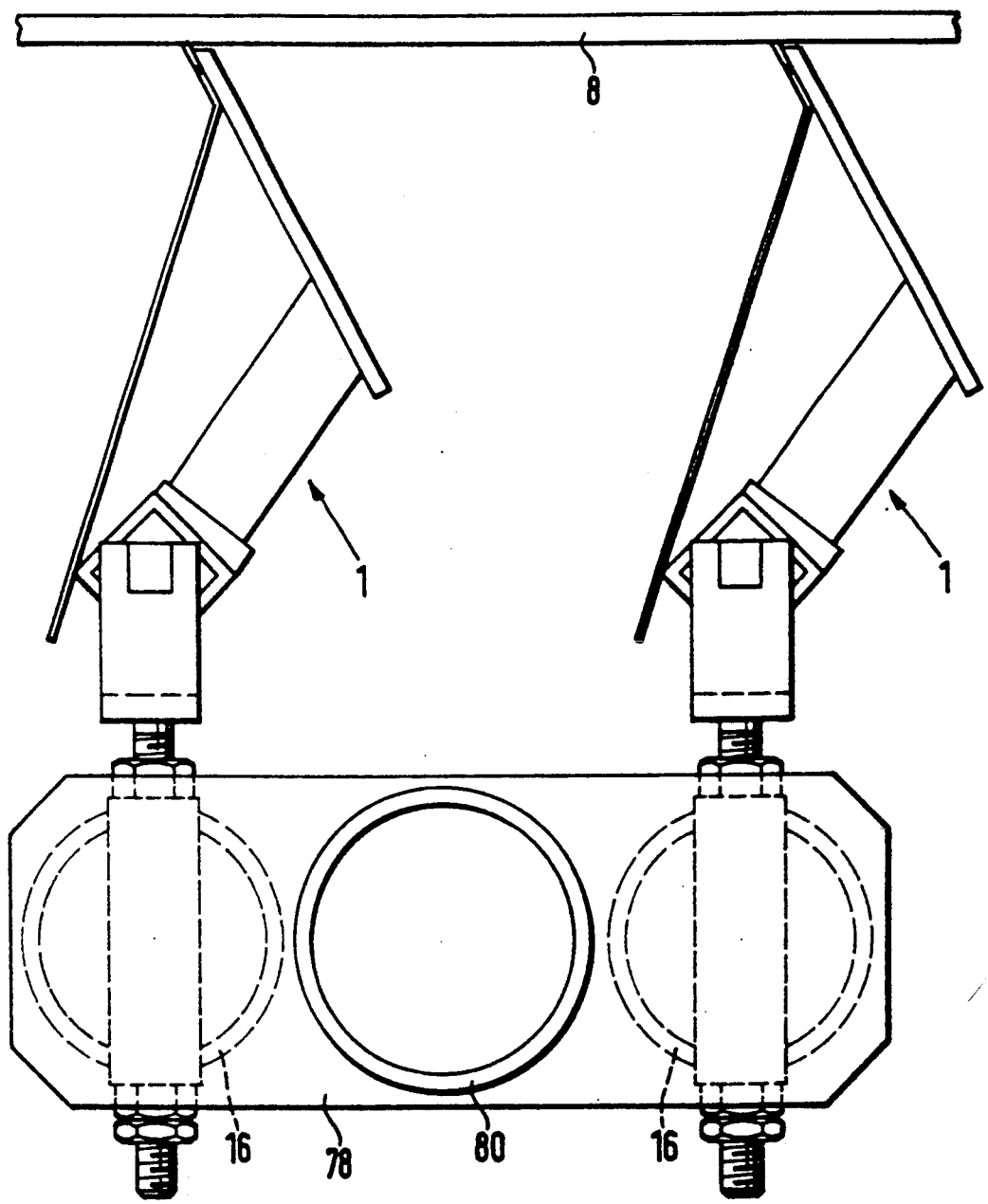

STRIPPING DEVICE FOR THE RETURN RUN OF CONVEYOR BELTS

This application is a continuation of application Ser. No. 076,728 filed July 23, 1987 which is now U.S. Pat. No. 4,850,474.

The invention relates to a stripping device for the return run of conveyor belts, which device consists of an adjustable, stationary or of an elastically supported carrier transverse to the direction of travel of the belt and of several stripping elements which are each held at feet and which are held adjacent to one another, if necessary in two rows, at the carrier and each carry a stripping lamella or a stripping blade which is held with the aid of a stripping body and is supported hinged and elastically by a torsion spring between each foot and this stripping body, in which, if necessary, the foot of a perpendicular dropped from the hinge to the stripped belt section is located, in the direction of belt travel, at a distance from the point of contact between the cutting edge of the stripping lamella or of the stripping blade and the belt section, which, at a maximum, corresponds to half the distance between the hinge and the belt section and in which, if necessary, the distance between the hinge and the belt and the parallelity of the stripping edge with respect to the belt section can be adjusted at each stripping element.

Such stripping devices have been known for a long time and have been very successful in the most difficult stripping tasks. The peeling cleaning effect in conjunction with an undelayed evasion movement of each stripping element in the case of contaminations which solidly adhere to the belt or in the area of joints results in very good cleaning with extreme belt care. However, these excellent characteristics are fulfilled only if the individual stripping elements are correctly adjusted, that is to say the stripping edge extends essentially in parallel with the belt surface and the contact pressure has the predetermined magnitude.

BACKGROUND OF THE INVENTION

In most conveyor belts used for transporting bulk material, the centre areas are more soiled than the outer edge areas. In consequence, the cleaning performance of the stripping elements arranged in the centre area is greater and thus more wear-intensive. As a consequence of this phenomenon, the individual stripping elements must be readjusted from time to time with respect to the belt surface concerned since an overall displacement of the carrier carrying the stripping elements is too gross; with such a readjustment, that for the stripping elements arranged in the centre area would be too little and for the stripping elements close to the edge regions it would be too much. Individual adjustment is performed by displacing each stripping lamella with respect to the stripping body carrying it.

In the known stripping device, the said parts are connected with the aid of a bolt and a stop nut, the screw bolt being secured against twisting due to the construction of the stripping body. However, readjustment at this location is very difficult since the amount of adjustment is frequently very difficult to estimate and accessibility is frequently greatly impeded. In particular, the new setting found can be lost again when the stop nut is tightened again unless the stripping lamella is specially held.

SUMMARY OF THE INVENTION

The invention has the object of proposing a stripping device of the type initially mentioned, with the application of which readjustment with respect to parallelity and/or distance of each stripping element from the belt surface to be stripped is much simpler or is performed automatically according to further developments. In addition, the behaviour of the device in the reversing mode of operation is intended to be improved with particular developments.

To achieve this object, the invention proposes that, for setting up parallel with respect to the belt, each stripping element can be swivelled about an axis which forms an angle $\alpha$ of less than 90° with the belt surface, on the side of the belt facing the strip ping element, the apex of which angle $\alpha$ is the point of angle $\alpha$ which is farthest along in the direction of belt travel.

The specified angle can assume approximately any value between 0° and 90°. For better understanding of the position of angle $\alpha$, angle $\alpha$ should be imagined as a solid structure having two legs, one leg coinciding with the underside of the belt and the other leg lying on the said axis. The apex then resulting is the point of the angle which is farthest along in the direction of belt travel during the cleaning operation. No other point of the angle along the legs reaches this extreme position.

Due to the inclined position of this axis, a swivelling movement of the stripping element in one or the other direction leads to a type of rocking motion of the stripping edge of the stripping lamella so that one edge of the stripping edge drops or rises compared with the other one with increasing swivelling away from the centre position. The desired parallelity between the stripping edge of the stripping lamella and the belt surface can be established on the basis of this phenomenon.

In particular simple embodiments of a stripping device according to the invention, this adjustment is performed manually by swivelling and securing the entire stripping element at an accessible point. With clever design, the location of the adjustment is located adjacently to or even below the carrier on which all stripping elements of a row are mounted. If a flap is used on each stripping element, this area is also not contaminated as a rule.

An embodiment is particularly advantageous in which the adjustment of parallelity between the cutting element and the belt surface is automatic. For this purpose, the swivellable support is left to itself, limits being predetermined, if necessary, with the aid of stops so that the stripping element is not aligned unchecked when the belt starts to travel from standstill. It is assumed that the belt has a stretched section which has the effect of a curvature and thus a change in the parallelity required until then. As a control input to the self adjustment, there is then firstly a pressure by the belt on one corner of the cutting edge whilst the opposite corner is relieved. In consequence of a rotation of the stripping element about the adjustment swivelling axis, the loaded corner thereupon escapes downward, because of the inclined position with respect to the belt surface, and in the direction of belt travel whereas the relieved corner is moved upward and against the direction of belt travel. This movement is concluded when both corners again rest against the belt surface with the same loading.

Depending on the amount of inclination, that is to say depending on the size of the angle $\alpha$, the change in parallelity is great or less great. It must be selected in such a manner that a stable contact is produced between the friction couples used, that is to say between the lamella edge and the belt material and no pendulum oscillations are created. Tests may have to be made to produce the optimum position. Although the lamella edges are basically produced of a highly wear-resistant material, constructions both in hardened steel and in hard metal are customary which clean belt materials of the most varied qualities.

Concerning the position of the swivelling axis in a stripping device according to the invention, it should be said again, that in the side view, the axis imagined to be extended up to the belt surface to be cleaned touches the belt, so to speak as a tractory, that is to say is inclined in the direction of belt travel. It is unimportant in this connection whether the axis intersects the belt plane in front of or behind the cutting edge of the stripping lamella, only the correct inclination is of importance. In completed plants, the swivelling axis can traverse the centre axis of the torsion spring or be located in front of and behind this centre axis. It is also unimportant whether the swivelling axis is realized in the area of the stripping body, that is to say for example between stripping body and lamella or is formed as swivelling connection between the foot of the stripping element and the stripping body, that is to say below the torsion spring hinge. Naturally, a hinged connection between the foot and a component mounted on the carrier can also be considered. The important factor is always the correct inclination of the swivelling axis which leads to an angle α of 75° to 45° in examples constructed. Naturally, this value can also be higher or lower in extreme cases of application.

As a swivelling connection, in particular, a sleeve and a bolt are available and it is unimportant with which component the sleeve and which component the bolt is associated. In deviation from this, roller bearings can also be provided which is always the case when a particularly sensitive adjustment is desired because, for example, the swivelling axis is relatively steep (α in the vicinity of 90°) or the fluctuations to be expected occur only for brief periods, that is to say a particularly rapid realignment of parallelity is required.

It has already been mentioned initially that an individual height adjustment of the stripping element compared with the belt surface is frequently also desirable. In the case of simple illustrative embodiments, the height adjustment can coincide with the adjustment of parallelity in such a manner that a swivelling is achieved by loosening a bolt secured with two nuts and a different& height position is achieved by screwing the nuts up and down along the bolt. In this arrangement, the height adjustment occurs along the axis about which the swivelling for adjusting parallelity also takes place. Adjusting the height in this manner at a slight angle compared with a perpendicular dropped to the belt surface is harmless. Naturally, this height adjustment can take p)ace independently of the adjustment of parallelity and depends on the operating conditions occurring. If, for example, the stripping element is used immediately in the area of a reversing roller of the conveyor belt, fluctuations in parallelity are not very likely. In this case, adjustment of the parallelity between the cutting edge of the stripping element and the belt surface can be omitted. However, a height adjustment& may quite well be desirable because of the different amount of wear of the individual stripping elements over the entire belt width.

It is particularly suitable to construct the linear adjustment for setting the height position or for the contact pressure of the stripping lamella against the belt surface in elastic manner so that any possible wear at the stripping lamellae corrects itself automatically. To implement this principle, a component connected to the stripping element, particularly a foot constructed as a bolt, rests against a rubber spring, a steel spring or a constructed or encapsulated gas spring. Details of such illustrative embodiments will be explained in greater detail in conjunction with the description of the figures. The important factor is the finding that the axis of the direction of displacement for the height adjustment extends essentially vertically with respect to the belt surface, that is to say does not have the inclination of the swivelling axis which has been described in conjunction with the parallel adjustment.

The reason for the axis of the direction of displacement for height adjustment having to extend approximately vertically with respect to the belt surface lies in the fact that an inclined position in the sense of the swivelling axis for the adjustment of parallelity would lead to a force component which would attempt to lift the stripping element. This force component would result in too high a height position or contact pressure force and, above all, prevent the stripping element from dropping back into its initial position if, as a result of an obstinate contamination or as a result of projecting parts, for example in the area of joints at the belt surface, the stripping element is violently deflected against the effect of the torsion spring so that it temporarily lifts away from the belt surface. In this brief period of lifting away, the spring lifts the stripping element as a whole. When the stripping lamellae again come to rest against the belt surface, the stripping element is pressed back into its nominal position if the axis for the height adjustment is correctly aligned whereas, in the case of an inclined position, this raised position will be largely retained due to the force component mentioned.

Independently of a manual or automatic parallel adjustment or height adjustment, it is suitable in particular cases to design the stripping element to be rotatable about an axis which extends essentially vertically with respect to the belt surface. If a height adjustment along an axis is provided, the axis of rotation can coincide with the axis for the height adjustment. Rotation of the entire stripping element about the axis of rotation is used during reversing operation, that is to say if the belt is used in both directions of travel. Free rotatability of the stripping element leads, after standstill and restart of the belt in the opposite direction, to the stripping element rotating in due course by 180° about the abovementioned second axis so that a stripping effect also exists in the reversing mode of operation. For these cases of application, it must be assumed that appropriate stripping devices are arranged at both discharge ends which can be of identical design.

Although the stripping element according to the invention in its original design is particularly well suited to reversing operation even without such rotation since the torsion spring allows the stripping body with the lamella attached to it to "fold through" which produces a trailing effect with very high belt care, this reversing position of the stripping element without rotation has the striking disadvantage that, despite the running-in which forms between the stripping lamella and belt surface, a certain cleaning effect is produced so that the entire rear of the stripping element is highly soiled after having been operated in reversing mode for a relatively long time. This is particularly undesirable because it is not as easy to take protective measures at this location. If, in contrast, the stripping element rotates by 180° as provided in accordance with the said development, a stripping effect is produced in reversing mode on the side provided for this purpose so that the measures taken for protection against soiling are fully effective.

It has already been pointed out above that this characteristic of free rotatability can be used independently of all other characteristics hitherto described. Naturally, combined use is also possible, that is to say also in conjunction with a swivelling movement about an inclined axis for setting up parallelity and in conjunction with a height adjustment, however this is designed. The type of actuation—on manual or automatic—is also freely selectable. It is of importance that the free swivellability of a stripping element for setting up parallelity about the inclined axis does not produce a rotation by 180° during a reversal of the direction of travel of the belt since such a rotation would involve too violent a disturbance of the belt path. Swivelling over at this point can be easily prevented with the aid of a swivel limit of the parallelity adjustment.

The same principles are used for constructing a swivellable support as have already been described in conjunction with the swivelling movement for achieving a parallel alignment of the stripping edge to the stripping lamella with respect to the belt surface. A repetition can here be omitted. It also applies to this swivelling connection that it can be laterally limited if a rotation by 180° in reversing mode is not desired but the automatic height adjustment is constructed as a sleeve-bolt link.

The evasion movements of the stripping elements can be very violent, particularly in the case of very rapidly travelling belts, so that they briefly lift away from the belt surface and subsequently come to rest again against the belt surface. At these instants, each spring for correcting wear is without counterforce, with the consequence that the stripping element is raised by a certain amount. Such raising can be undesirable since the stripping element then initially operates with an unfavourable contact angle. To avoid the lifting, the invention, in a development, proposes a hydraulic damping of the spring which can be particularly easily implemented in conjunction with an encapsulated gas spring. In that case, there are only very slow positional changes along the axis of adjustment which are capable of tracking any wear but largely leave out movements which would be possible due to a short-term interruption in counterforce. Similarly good spring and damping characteristics are obtained if a piston cylinder unit is used as spring in which the hydraulic medium is loaded by a gas cushion. Almost any damping characteristic can be freely selected due to the hydraulic guidance. Such hydro-pneumatically guided and adjustable stripping elements, however, are suitable only for special tasks due to the high costs.

To implement the inclined position of the axis for setting up parallelity, it is particularly suitable to provide a carrier of a tube to which lugs having one drilled hole each are for example welded laterally at predetermined distances approximately with the desired inclination and to which the respective guide and fixture of each stripping element is attached. With lateral clamping in corresponding holders, the tubular construction of the carrier enables twisting about the longitudinal axis by means of which, if necessary, the inclination of the adjustment axis can be corrected or set up. A possible change in distance from the underside of the belt can be very easily compensated by the holders for holding the tube ends being adjusted correspondingly which, as a rule, is very easily possible since these holders are held on threaded spindles which are anchored on the conveyor belt structure. The axial inclination can be individually adjusted in this manner.

In deviation from this, instead of the lug, a sleeve can be, for example, welded in each case into the tubular carrier which fulfils the same purpose, only the threaded bolts or threaded sleeves penetrating through the sleeve must then be constructed to be slightly longer.

Finally, a common spring can be provided for the stripping elements of a single carrier, in the form of a pneumatic spring which is located inside the tubular carrier if the individual stripping elements are guided in such a manner that the free ends of the feet point into the inside of the tubular carrier and rest on the spring. The hardness of the spring effect can be determined by an appropriate pressure loading. In deviation from this, each foot can be used in an essentially gas-tight guide as piston which is displaced by the tube carrier when the inside of the tube is loaded with a corresponding gas pressure.

In the text which follows, illustrative embodiments of the invention represented in the drawing are explained in greater detail; in the drawing:

BRIEF DESCRIPTION OF THE DRAWINGS

FIG. 1 shows a side view of a stripping element with guide and mounting according to the invention in a first illustrative embodiment, FIG. 2 shows a view according to FIG. 1 of an illustrative embodiment with self-adjusting parallelity between the stripping edge on the stripping lamella and the belt surface, FIG. 3 shows a view of another illustrative embodiment of a stripping element with a guide and mounting as in the illustrative embodiment according to FIG. 1, FIG. 4 shows a side view of another illustrative embodiment of a stripping element according to the invention with automatic parallel adjustment and automatic height readjustment and using a rubber spring, FIG. 5 shows a view according to FIG. 4 as part-view to clarify the possible use of a helical spring instead of the rubber spring, FIG. 6 shows a view according to FIG. 4 to clarify the use of a pneumatic cylinder or hydraulic cylinder instead of an elastic spring, FIG. 7 shows a side view of another illustrative embodiment of the invention with manual adjustability of the parallelity and of the height of the stripping element, using a sleeve, FIG. 8 shows a view of another illustrative embodiment of the invention with a pneumatic spring, including a tubular carrier and automatic adjustment of the parallelity, FIG. 9 shows a view according to FIG. 8 to clarify a variant of a gas spring, FIG. 10 shows a view according to FIG. 8 to clarify another illustrative embodiment of a gas spring, FIG. 12 shows a side view of another illustrative embodiment according to the invention with automatic parallel adjustment and height adjustment effected by gas pressure, FIG. 13 shows another illustrative embodiment of the invention similar to that according to FIG. 12 but using a helical spring of steel, FIG. 14 shows a view according to FIG. 13 as section to clarify a variant without height adjustment, FIG. 15 shows a side view of another illustrative embodiment of the invention with a stripping blade as cleaning element with automatic parallel and height adjustment, FIG. 16 shows a side view of a stripping device with two rows of stripping elements and FIG. 17 shows a side view of a device for accommodating the part device represented in FIG. 16 below a conveyor belt with a holder carried on guide rods.

DESCRIPTION OF THE PREFERRED EMBODIMENTS

Figure 11:
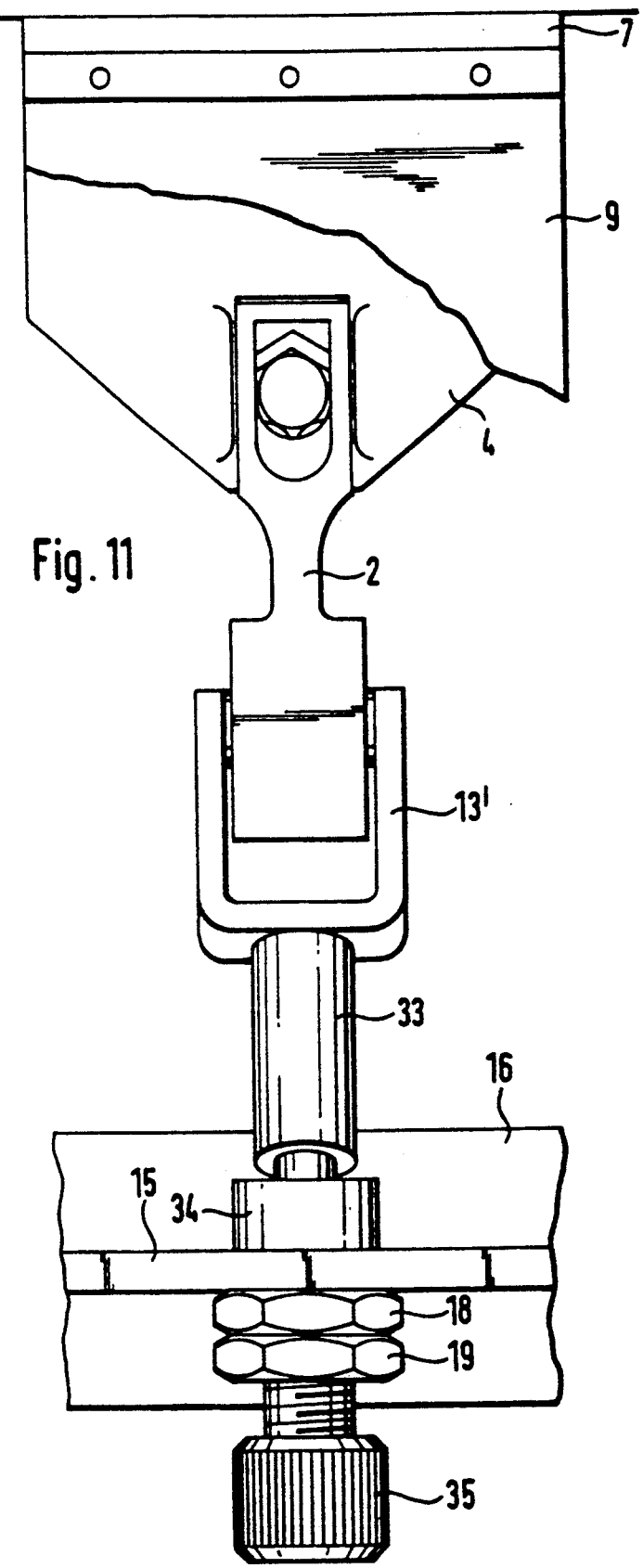
FIG. 11 shows a front view of the illustrative embodiment according to FIG. 6.

In FIG. 1, the essential component of a stripping device according to the invention is represented in the form of a stripping element 1 of which, as a rule, several specimens are arranged adjacently to one another above and below the plane of the picture. Each stripping element 1 covers a width of approximately 12 cm so that, for example, with a belt width of 1 m, eight such stripping elements 1 are arranged adjacently to one another. On a stripping body 2, a torsion spring 3 is located at the lower end which has both a spring effect and effects guidance of a swivelling movement about its centre axis. At the other end of the stripping body 2, a stripping lamella 4, equipped with a hard metal lip 7 at the edge resting against the belt 8, is mounted with the aid of a bolt 5 and a stop nut 6. In FIG. 1, the functional position is reproduced in which the hard metal lip 7 peels the surface of belt 8. The belt 8 runs in the direction designated by the arrow, the peeling forces being produced by the torsion spring 3. In the case of a contamination which cannot be peeled off or, for example, when a belt joint passes, the unit formed of the stripping body 2 and the stripping lamella 4 is capable of escaping against the action of torsion spring 3 so that damage both of the belt 8 and of stripping element 1 is as good as impossible.

The stripped material drops from the hard metal lip 7 onto a flap 9 consisting of plastic which ensures that the components underneath are not covered with the stripped material. This is because, with appropriate consistency, the stripped material can harden with time so that accessibility of these components can be seriously impaired unless precautions are taken by an appropriate flap 9.

The torsion spring 3 is formed by four rubber cushions 12 which are accommodated in the corners of a square housing 10. The centre of the housing 10 is filled by a square 11 which, together with the housing 10, forces each rubber cushion 12 into an essentially triangular shape. A foot, for example in the form of an L-shaped angle 13 or other elements for holding the stripping element 1 are then always attached to the square 11.

In the present case, the stripping element is held at the angle 13 on the lower free leg of which a threaded bolt 14 is anchored. This is attached with the aid of two contoured nuts 17 and 18, secured by a counter nut 19, to a web 15 which is laterally welded to a carrier constructed as tube 16. The centre axis 20 of the bolt 14, and thus the entire structure held via a threaded bolt 14, is arranged inclined by an angle of 75° with respect to the belt underside. The projection of the centre axis 20 clearly contacts the belt surface in an inclined position behind the hard metal lip 7 so that parallelity between the hard metal lip 7 and the adjacent belt surface is lost or changes during a swivelling movement of stripping element 1 about the axis 20, which is used for adjusting parallelity.

After loosening the counter nut 19 and loosening the two contoured nuts 17 and 18, the entire stripping element can be altered along the axis 20 by screwing the two nuts 17 and 18 down or up and, in addition, the rotational position about the axis 20 can be set. Manual setting-up for optimum adjustment of the stripping element with respect to the belt 8 is possible in this manner.

Figure 17:
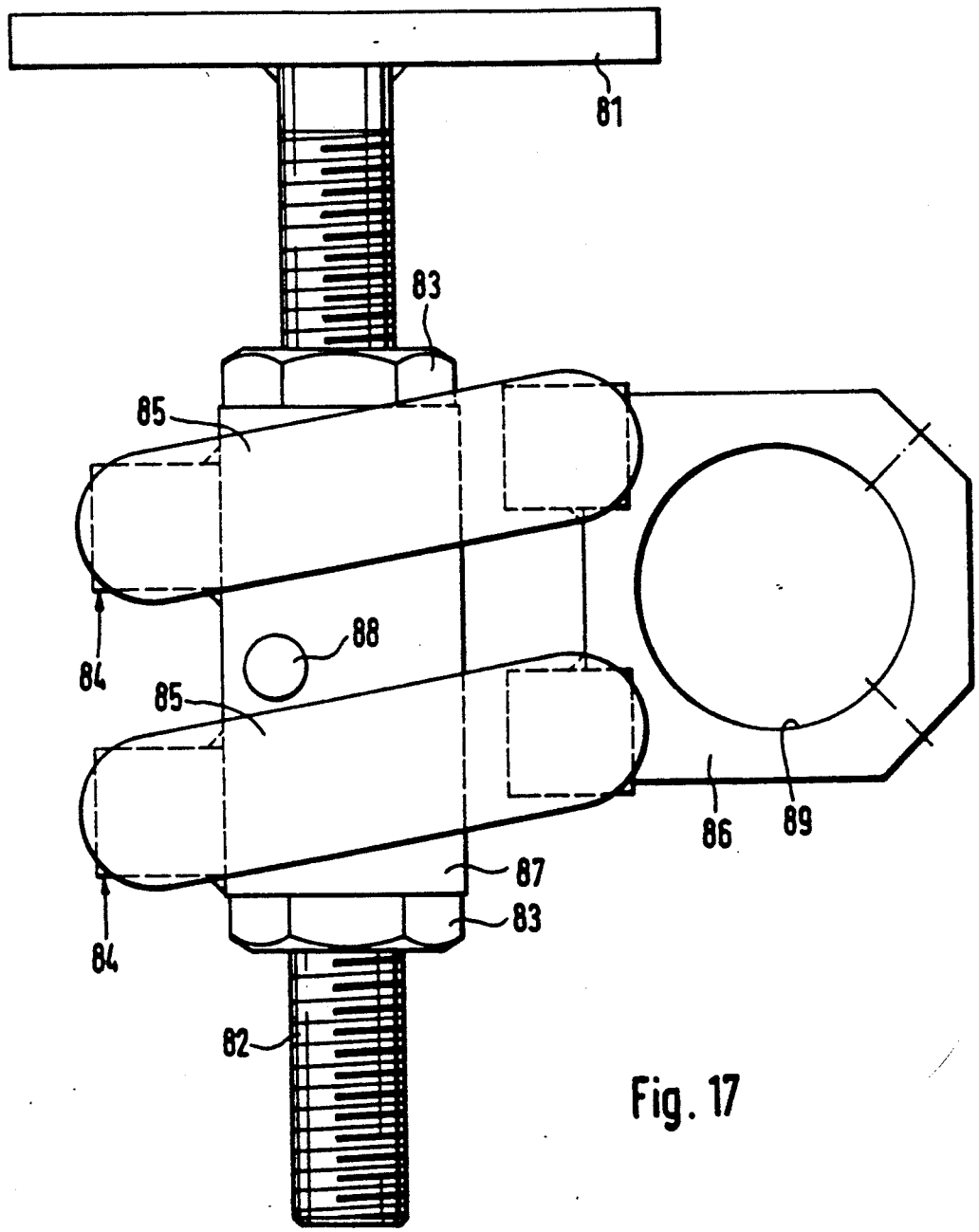

The tube 16 serving as carrier is laterally supported by holders explained in conjunction with FIG. 17 and these, in turn, are mounted on so-called system carriers, that is to say on threaded spindles hanging down vertically from the conveyor frame on both sides of the conveyor belt. The holders can be used both for effecting a coarse height adjustment of the entire tube 16, its parallel adjustment with respect to the belt underside and, within narrow limits, a change in the angle α. The tube 16, therefore, can be rotated about itself in the holders and clamped tight so that parallelity and distance of tube the 16 with respect to the belt 8 can be set up. In each case, an angle α is obtained the apex 21 of which is on the belt surface, on the one hand, and, on the other hand, on the axis 20 and the size of which is less than 90°, particularly between about 75° and 45°.

The illustrative embodiment shown in FIG. 2 differs from that explained above primarily by the way in which the stripping element 1 is attached to the web 15. In this illustrative embodiment, a threaded sleeve 23 is fixed with the aid of the two contoured nuts 17 and 18 and secured with the aid of counter nut 19 in which a bolt 24 is supported to be swivellable. The bolt 24, resting flush against the threaded sleeve 23 on one side is axially secured on the other side with the aid of a washer 25 and of a fan-type lock washer 26 so that the adjustment along the axis 20 must still be made with the aid of the nuts 18 and 19 but the adjustment about the axis 20 occurs automatically. Naturally, the possibilities for changing the position of the tube 16 serving as carrier also exist in this illustrative embodiment.

During the setting up of the stripping element 1 shown in FIG. 21 it is essentially the pretension with which the stripping lamella 4 rests against the belt 8 with its hard metal lip 7 which is adjusted with the aid of the three nuts 17, 18 and 19. The parallelity of the stripping lamella 4 with respect to the belt surface occurs automatically by a swivelling movement about the axis 20. It can be seen quite easily that during a swivelling movement of the unit held on the bolt 24 one edge region of the hard metal lip 7 detaches itself from the belt whereas the other edge region wants to penetrate deeper into the belt 8 because the locus of the movement of these two points, which is a circle about the axis 20, penetrates the belt surface. The resultant higher peeling force on the rising side of hard metal lip 7 results in a return swivelling until an equilibrium of peeling forces prevails again over the entire length of the hard metal lip 7. In this manner, the stripping element 1 automatically adjusts also to temporary belt deformations which are encountered by the stripping device during one revolution.

The only prerequisite for automatic adjustment is a certain lateral space next to each stripping lamella 4 so that a limited swivelling path is available. In the result, this prerequisite leads to two rows of stripping elements being provided for careful cleaning of the belt which are staggered with respect to one another and thus have a distance from one another which approximately corresponds to their width.

The illustrative embodiment according to FIG. 3 differs from that of FIG. 1 only in the different design of the stripping body 29 and of a stripping blade 28 and its attachment to the stripping body 29. Due to the one-piece long construction of the stripping blade 28, it takes over the functions of the stripping lamella and of the flap. In addition, mounting is simplified with the aid of a rivet 30. This simplification can be implemented without disadvantages due to the fact that an adjustment of parallelity or readjustment for compensating wear is no longer required at this point; these adjustment operations are carried out exclusively in the area of the web 15 and of the threaded bolt 14 with the aid of nuts 17, 18 and 19 involved. For the rest, wear on a hard metal lip 7 is extremely slight so that the height adjustment for wear compensation is very rare.

In the illustrative embodiments according to FIGS. 4 and 5, automatic readjustment of the pretension, that is to say elastic displacement along a second axis 40 also exists in addition to the self adjusting parallity of the stripping lamella 4 with respect to the belt 8. Since swivelling for the parallel adjustment must take place about the inclined axis 20 but the height adjustment or readjustment of the pretension must take place about an axis 40 which extends essentially vertically with respect to the belt surface, both functions are separate so that two supports exist independently of one another for the two axes 20 and 40.

At the lower end of the angle 13, a hinged bolt 32 is located which is rotatably accommodated within a hinged sleeve 33. Axial movement is prevented by a snap ring whilst a sealing collar provides for the necessary sealing of this hinge. It is used for carrying out the swivelling movement, that is to say the parallel adjustment about the axis 20. The lower end of the hinged sleeve 33 is formed by a bolt which is displaceably supported within a flange bushing 34. The flange bushing carries on its side an elongated hole 38 which is engaged by a pin 39 driven into the bolt part. The lower end of the bolt rests against a rubber spring 36 (FIG. 4) or on a helical spring 37 (FIG. 5) so that the unit attached to the hinged sleeve 33 is vertically displaceable along the axis 40 and is pressed upwards due to the springs 36 or 35, respectively.

In FIGS. 4 and 5, the highest position is reproduced in which the pin 39 abuts the upper end of the elongated hole 38. To create a further readjustment possibility, a washer or several washers would have to be placed under the collar of the flange bushing 34 after loosening the counter nut 19 and the nut 18 so that the entire unit is arranged to be higher compared with the web 15. For the rest, this functional position always occurs when the load from belt 8, resting on the stripping element 1 is temporarily very weak or is even interrupted which is the case if the stripping body 2 is designed to be strong and in the case of severe deformations of the belt. The pretension of the rubber spring 36 or of the helical spring 35, respectively, can be adjusted by screwing the retaining nu 35 in by varying amounts. As a rule, however, the retaining nut 37 is screwed in up to its stop at which the nominal pretension occurs.

In the illustrative embodiment according to FIG. 6, one of springs 36 or 37, respectively, is replaced by an encapsulated gas spring 44 the piston rod 45 of which supports the lower end of the bolt 43 held in the hinged sleeve 42. For the rest, both illustrative embodiments are identical so that an explanation of the general function can be omitted. Compared with conventional helical springs or block springs of an elastomer, gas springs have the advantage that the spring force is approximately constant over the entire spring excursion. This particularly applies to short spring excursions which apply in the present case. In addition, the spring can be damped hydraulically or by an appropriate oil filling of the gas spring which has particular advantages in conjunction with the stripping device according to the invention.

With a strong deflection of the stripping element 1, particularly in the case of belts travelling very rapidly, the contact force acting against the spring force is interrupted for fractions of a second since the stripping lamella 4 is lifted away from the belt 8. An adjustment in the direction of the axis 40 by the piston 45 of the encapsulated gas spring 44 is undesirable for this brief period of time. In this case, the hydraulic damping ensures that only a negligible distance of displacement is travelled in a corresponding situation so that the stripping element has essentially retained its initial position after contact is reestablished against the belt. Naturally, the required adjustment distances due to wear of the hard metal lip 7 are fully effected by the spring without loss by the damping so that ideal conditions exist for readjustment of the wear but with suppressed readjustment during short-time lifting away of the stripping element 1 from the belt 8 due to the hydraulic damping.

The illustrative embodiment shown in FIG. 7 is directly comparable with that of FIG. 1 with respect to function. Instead of a lateral lug 15, a sleeve 47 is welded into the tube 16 serving as carrier. Only the bolt 14 is of longer construction to penetrate completely through the sleeve 47. Thus, adjustment occurs in the usual manner with the aid of contoured nuts 17 and 18 and with the aid of a counter nut 19. Thus, this illustrative embodiment relates to a purely manual adjustment both of the contact force of the stripping lamella against the belt 8 and of the parallelity between these two elements.

Naturally, all modifications and developments presented in FIGS. 2 to 6 can also be transferred to the illustrative embodiment according to FIG. 7, in which case the bolts and the flange bushings, respectively, have to be constructed to be longer in each case.

The illustrative embodiments reproduced in FIGS. 8, 9 and 10 differ in each case with respect to the elastic wear readjustment; automatic parallel setting-up of the stripping lamella 4 with respect to the belt 8 occurs in all cases by means of a swivelling movement about the axis 20, the support being designed in a particular manner.

Below the torsion spring 3, a bearing housing 49 is arranged in which two roller bearings are located and, particularly, two ball bearings 48. They are used for rotatably supporting a shaft 50 the lower end of which is constructed as support bolt 51. The support formed in this manner is secured against unintentional disassembly with the aid of circlips. In contrast to the illustrative embodiments previously presented, the centre axis 40 for the swivelling movement of the stripping element 1 does not extend through the centre axis of the torsion spring because this is of no importance to the operation. Due to the special design, the point of contact between the hard metal lip 7 and the point of penetration of the centre axis 40 of the support bolt 51 becomes particularly large so that the support bolt 51 which is swivellable in a sleeve 52 and displaceable in the axial direction is held in a particularly stable manner in the trailing position shown.

This stable trailing position ensures that, if at all, only slight swivelling movements about the axis 40 occur in continuous operation which are accompanied by restoring forces which are always strong. These conditions change drastically only when the direction of the belt travel is reversed: the entire system becomes particularly unstable with respect to the axis 40 as a rotational axis so that the stripping element swivels by 180° about the axis 40. The smallest asymmetrical force attacking the stripping lamella 4 is sufficient for this. Thus, the special design is utilized for the purpose that the stripping element in this illustrative embodiment also swivels around by 180° when the direction of belt travel is reversed. Thus, this illustrative embodiment is particularly suitable for reversible belts.

In the illustrative embodiment according to FIG. 8, readjustment of wear and of the contact pressure force against the belt 8 is effected with the aid of a pneumatic spring 53 which is inserted into the tube 16 serving as carrier and can be charged with different amounts of compressed air. It presses against the free end of the support bolt 51 which, in consequence, tends to move out of the sleeve 52 in the axial direction of the axis 40. If necessary, a locking device can be applied against complete slipping out.

The illustrative embodiments reproduced in FIGS. 9 and 10 differ in each case with respect to the elastic wear readjustment: the automatic parallel adjustment is only indicated with the aid of the bearing housing 49. In the illustrative embodiment according to FIG. 9, a socket 56 is welded into the drilled tube acting as carrier, in which socket a guide sleeve 58 is secured with the aid of a retaining nut 57. A support bolt 55 is capable of rotating and sliding in the axial direction in the guide sleeve 58.

The lower end of the guide sleeve 58 and the projecting end of the support bolt 55 is connected via a pressure plate to a bellows 59, the plate and the bellows being vulcanized together. The inside of the tube 16 acting as carrier can be placed under gas pressure with means not shown so that gas forces are created which compress the bellows 59 and tend to press the support bolt 55 into the guide sleeve 58. These forces are utilized for a spring effect.

This arrangement has the advantage that the support bolt 55 can be removed from the guide sleeve 58 without any further manipulation. Such an advantage cannot be offered by the illustrative embodiment according to FIG. 10 because the bellows 60 is much wider and is permanently joined with its free end to the support bolt 55 with the aid of a circlip. Nevertheless, this illustrative embodiment also has its special advantages. The bellows area is much larger so that much less bending is required for the same adjusting distance which has an advantageous effect on its life.

In FIG. 11, a front view of the illustrative embodiment according to FIG. 4 is shown. In this view, the shape of the stripping lamella 4 becomes clear and the symmetrical position of the axes 20 and 40 in lateral direction with respect to the stripping lamella 4 and thus to hard metal lip 7. For the rest, the same components are designated by the same reference symbols. Also, a U-shaped bracket 13' is reproduced instead of an L-shaped angle 13 which is without significance in connection with the invention.

The illustrative embodiment reproduced in FIG. 12 differs from those described above in as much as the hinged connection for forming the swivelling axis 20 for parallel adjustment is arranged above the torsion spring hinge 3, that is to say between the stripping lamella 4 and a hinged bolt 61 forming the stripping body. This hinged bolt 61 is surrounded by a hinged sleeve 62 welded to the stripping lamella 4, the combination of the two parts with each other being secured by a snap ring 63. Because of the steep angle of the axis 20, a lateral limitation of the swivelling movement of the hinge sleeve 62 about the hinged bolt 61 can be provided, for example in the form of an elongated hole in the sleeve 62 and of a pin (not shown in each case) in the hinged bolt 61. The swivelling movement can be limited in this manner, for example by 10° to 15° on both sides of the centre position.

The foot of the stripping element 1 is again formed by an angle 13 which is adjoined by a piston 65. This plunges into a cylinder 64 which is welded into the tube 16 forming the carrier. In the lower region of the piston 65, two sealing collars 66 can be seen which are in each case held directly adjacent to a flange on the piston 65. Between the upper flange and a retaining nut 69 screwed onto the cylinder 64, a spring 68 is located which presses the piston downwards into the position shown.

The cylinder 64 is provided on its underside with an opening 67 through which a pressure medium introduced into the tube 16 can act on the piston 65. With an appropriate pressure—compressed air is to be preferred as pressure medium—the piston 65 is raised against the action of the spring 68 so that this arrangement can be used for setting up the height adjustment or the adjustment of the contact pressure force of the stripping element 1 against the belt surface 8.

For the rest, the piston 65 is held to be freely rotatable in the cylinder 64 so that this illustrative embodiment is also suitable for reversing operation in which the stripping element rotates by 180° about the axis 40.

In the illustrative embodiment according to FIG. 13, the structure above the angle 13 is identical to that of the illustrative embodiment according to FIG. 12. The angle 13 is adjoined towards the bottom by a stepped bolt 70 which is guided in a bushing 71 welded into the tube 16. Between the step of the stepped bolt 70 and the bottom end of the bushing 71, a spring 72 is installed which has the tendency of lifting the stripping element as a whole. A snap ring 73 attached to the lower end of the step bolt 70 forms a stop which limits the lifting movement due to the spring 72 in an upward direction.

It can be seen clearly again that the stepped bolt 70, the bushing 71 and the spring 72, as a whole, enable the height to be adjusted and thus the contact pressure force of the stripping element against the belt surface to be regulated whilst a swivelling movement about the axis 20 effects a setting up of parallelity between the stripping lamella 4 and the belt surface. In this illustrative embodiment, a swivelling limit is indicated in the form of an elongated hole 77 and a pin 74. This illustrative embodiment is also suitable for reversing operation with a swivelling of the entire element by 180° with a reversal of the direction of belt travel.

FIG. 14 is intended to clarify the possibilities existing overall for variation in the device according to the invention. The structure above the angle 13 is again identical to that of FIG. 13. Instead of automatic height adaptation, it is only possible to swivel a bolt within a sleeve 75 which is effected by an appropriate snap ring 76. Thus, the illustrative embodiment of FIG. 14 allows automatic setting-up of the parallelity but not of the height adjustment. On the other hand, this illustrative embodiment is again suitable for reversing operation since the entire element automatically turns by 180° when the direction of belt travel is reversed.

In FIG. 15, similar to the illustrative embodiment of FIG. 3, a stripping blade 90 is provided which is equipped with a rear part 91 as integral component. Within the rear part 91, a drilled hole 92 is located in which a hinge bolt 93 is rotatably supported and secured against axial displacement with the aid of a snap ring 94. It is therefore at this point that the swivelling movement for setting up parallelity between the hard metal lip 7 and the belt surface is produced. The area below the torsion spring hinge 3 is structured in the same manner as in the illustrative embodiment according to FIG. 13 so that a description can be omitted at this point.

The stripping blade 90 is continued downwards in the width of the hard metal lip 7 approximately to the upper edge of the tube 16 so that it has the effect of a flap. The lower end of the stripping blade 90 must thus be located above the tube 16 so that a swivelling of the entire stripping element past the tube 16 is possible in reversing mode.

In FIG. 16, an arrangement of stripping elements 1 in two rows behind each other is shown. It can be easily imagined that one row is arranged to be offset approximately by half the width of one stripping element 1 compared with the other row so that the stripping lamellae are staggered. Very careful cleaning of the belt surface is achieved in this manner, some areas, namely the overlap areas being stripped even twice.

In the illustrative embodiment shown, a separate tube 16 exists for each row of stripping elements, each stripping element being anchored in a similar manner as in the illustrative embodiment of FIG. 7. Thus, a sleeve is welded in each case into the tube serving as carrier through which a threaded bolt passes which is held with the aid of nuts including a counter nut. The construction above the torsion spring hinges corresponds to FIG. 13 which is not shown in greater detail.

It can be easily seen that a single tube could also have been used as carrier to which lugs 15 would have been attached in the manner described in conjunction with FIG. 1 at the front and at the rear. Thus, it is not a condition that two tubes are also used for two rows of stripping elements.

The two tubes 16 which are located behind each other and are used as carriers are combined on their sides by a side plate 78 to the outside of which a tube stub 80 is welded. The actual holding of the unit consisting of the two tubes including accessories takes place on this tube stub. Such a holding method is shown by way of example in FIG. 17. The holder 86 provided with a drilled hole is used for accommodating the tube stub 80, indicated screws allowing the tube stub 80 to be immovably clamped in the drilled hole 89 of the holder 86.

The holder 86 is accurately guided with the aid of two guide rods 85, the guide rods being rotatably hinged in the area of the holder 86, their other ends being constructed as torsion spring hinges 84. The two torsion spring hinges impart an upwardly directed pretension to the guide rods 85 so that the holder 86 is moved upwards against the belt surface.

The torsion spring hinges 84, in turn, are attached to a system carrier 87 which is adjustable in height along a spindle 82 with the aid of nuts 83. The spindle exhibits at its top end a screw connection plate 81 which is screwed to the structure of the conveyor belt. This type of attachment with the aid of a screw connection plate 81 and a spindle 82 is known per se. The system carrier 87 also carries a stop 88 which limits the swivelling movement 85 of the guide rods in the counterclockwise direction.

During a new installation or when the stripping device is adjusted from the beginning, the system carrier 87 is initially screwed towards the belt on each side of the belt by adjusting the nuts 83 until the stripping elements rest against the belt surface with a particular average pretension. After fixing the position of the system carriers 87 and clamping the tube stubs 80 tight in the holders 86, each stripping element is individually adjusted with respect to the belt surface in the manner described several times in the preceding text. During this process, individual attention can be paid to a belt shape deviating from a level shape. Parallelity between the individual stripping lamellae and the belt surface automatically occurs in the manner described so that all work is thus completed.

The illustrative embodiments described above relate throughout to stripping lamellae or stripping blades the cutting edges of which are set up against the direction of travel, thus resulting in a peeling motion. Although this type of stripper is preferred by the invention, it is not a condition for the successful use of the invention. The manual or automatic adjustment of parallelity and of the contact pressure force of a stripping element against the belt surface can also be successfully performed in the manner according to the invention in conjunction with strippers which are vertical with respect to the belt surface or even with strippers which are pulled as a trailing device. Thus, these types of construction are directly covered by the invention.

I claim:

1. In a stripping device for the return run of a conveyor belt, said device comprising a carrier adapted to be mounted extending transversely to the direction of travel of said belt; and a plurality of mutually adjacent stripping elements each having a mounting foot by which said element is mounted on said carrier, a stripping body which is supported by a hinge and resiliently by a torsion spring around a first axis between said foot and said stripping body, and stripping blade means held on said stripping body; the improvement wherein for maintaining parallelity of said stripping blade means with said belt each of said stripping elements or only said stripping body of each of said stripping elements is adapted to be freely swivellable around a second axis which intersects with a plane of the belt and forms an inclined angle of 90° or less with the approaching part of said belt, wherein said first axis is not parallel with said second axis.

2. A stripping device according to claim 1 wherein the range of said swivelling is limited, to a swivelling angle of 10° to 15° on both sides of a center position.

3. A stripping device according to claim 1 wherein a third axis extends essentially perpendicularly to said belt and, seen in the direction of travel of said belt, intersects said belt sections upstream of a cutting edge of said stripping blade means.

4. A stripping device according to claim 2, wherein stops are provided for limiting said swivelling angle.

5. A stripping device according to claim 2, said device further including an elongated hole for a pin which is moveable therein, wherein stops are provided for limiting said swivelling angle, said stops being formed by the walls of said elongated hole.

6. A stripping device according to claim 1, wherein said included angle is further limited to less than 90°.

7. In a stripping device for the return run of a conveyor belt, said device comprising a carrier adapted to be mounted extending transversely to the direction of travel of said belt; and a plurality of mutually adjacent stripping elements each having a mounting foot by which said element is mounted on said carrier, a stripping body which is supported by a hinge and resiliently by a torsion spring about a first axis between said foot and said stripping body and stripping blade means held on said stripping body; a line perpendicular to the belt and intersecting said hinge being located, in use, in the direction upstream of the contact point between said stripping blade means and said belt; and the parallelity of said stripping blade means with respect to said belt being adjustable at each stripping element; the improvement wherein, for maintaining the parallelity of said stripping blade means with said belt, each of said stripping elements or only said stripping body of each of said stripping elements is supported to be freely swivellable about a second axis which forms an included angle of 90° or less with the approaching part of said belt, wherein said first axis is not parallel with said second axis.

8. A stripping device according to claim 7 wherein the range of said swivelling is limited, to a swivelling angle of 10° to 15° on both sides of a center position.

9. A stripping device according to claim 7 wherein a third axis extends essentially perpendicularly to said belt and, seen in the direction of travel of said belt, intersects said belt section upstream of a cutting edge of said stripping blade means.

10. A stripping device according to claim 7, wherein a freely rotatable support is arranged between said foot and a component held at said carrier; one part of said freely rotatable support being constructed as a pin and the other part as a sleeve and wherein said carrier is constructed as a tube carrying said sleeves corresponding in number to said stripping elements, said sleeves being open towards the inside of said tube; wherein each of said feet consists of a guide sleeve with a bolt which is rotatably supported and displaceable towards the belt; and wherein a sealing collar is arranged between said bolt and said guide sleeve, said tube being adapted to be placed under a predetermined preselectable gas pressure.

11. A stripping device according to claim 7, wherein said included angle is further limited to less than 90°.

12. In a stripping device for the return of a conveyor belt, said device comprising a carrier adapted to be mounted extending transversely to the direction of travel of said belt; and a plurality of mutually adjacent stripping elements each having a mounting foot by which said element is mounted on said carrier, a stripping body which is supported by a hinge and resiliently by a torsion spring about a first axis between said foot and said stripping body, and stripping blade means held on said stripping body, the improvement wherein each of said stripping elements is supported so as to be freely rotatable about a second axis which extends essentially perpendicularly to said belt and, seen in the direction of travel of the belt intersects the belt section upstream of a cutting edge of said stripping blade means, wherein said first axis is not parallel with said second axis.

13. In a stripping device for the return run of a conveyor belt, said device comprising a carrier adapted to be mounted extending transversely to the direction of travel of said belt; and a plurality of mutually adjacent stripping elements each having a mounting foot by which said element is mounted on said carrier, a stripping body which is supported by a hinge and resiliently by a torsion spring about a first axis between said foot and said stripping body, and stripping blade means held on said stripping body; a line perpendicular with the belt and intersecting with said hinge being located, in the direction upstream of the contact point between a cutting edge of said stripping blade means and said belt; and the parallelity of said cutting edge of said stripping blade means with respect to said belt being adjustable at each stripping element; the improvement wherein each of said stripping elements is supported so as to be freely rotatable about a second axis which extends essentially perpendicularly with respect to said belt and, seen in the direction of travel of said belt, intersects said belt upstream of said cutting edge of said stripping means, wherein said first axis is not parallel with said second axis.

* * * * *